Sheet: II  Sheet 2. II Sheets.
W. H. H. Heydrick's Steam Plow.
118013
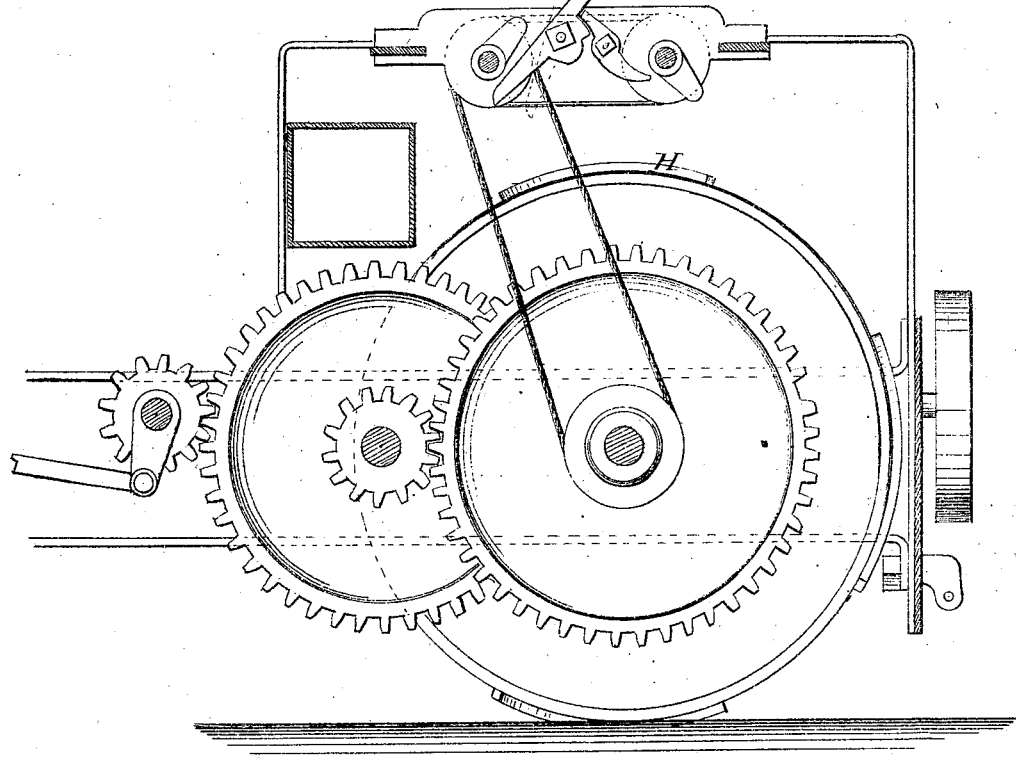
Fig. 3.
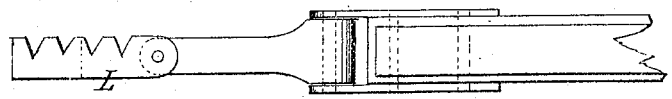
Fig. 4.
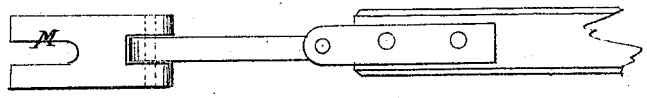
Fig. 5.
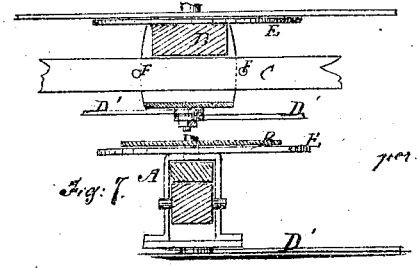
Fig. 6.
Fig. 7.
Witnesses:
Chas. Nida
Wm. H. C. Smith
Inventor:
W. H. H. Heydrick
per
Attorneys.

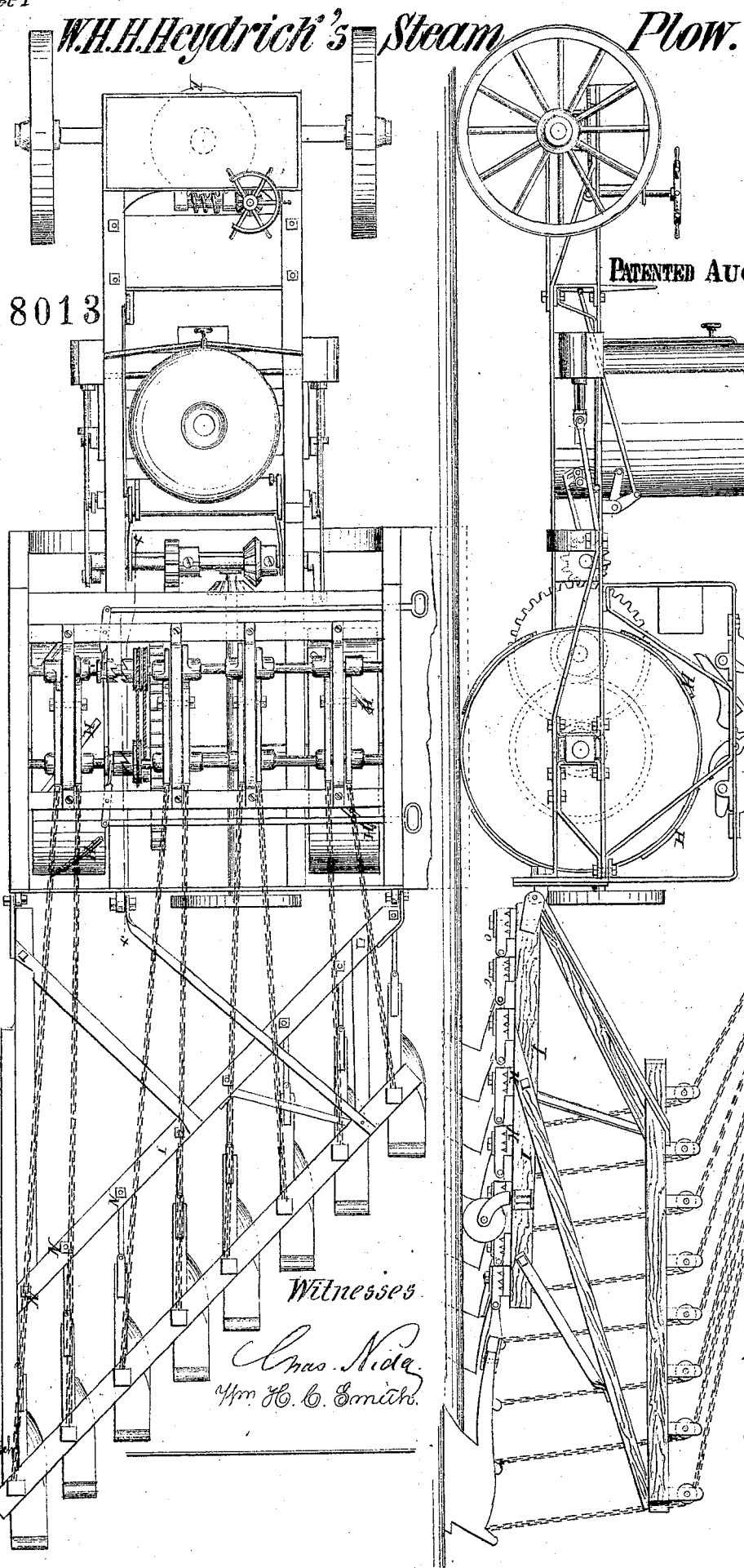

UNITED STATES PATENT OFFICE.

WILLIAM H. H. HEYDRICK, OF CHESTNUT HILLS, PENNSYLVANIA.

IMPROVEMENT IN MODES OF ATTACHING PLOWS TO TRACTION-ENGINES.

Specification forming part of Letters Patent No. 118,013, dated August 15, 1871.

*To all whom it may concern:*

Be it known that I, WILLIAM H. H. HEYDRICK, of Chestnut Hills, Pennsylvania, have invented a new and Improved Plow Attachment for Traction-Engines; and I do hereby declare that the following is a full, clear, and exact description of the same, reference being had to the accompanying drawing forming a part of this specification.

My invention consists in a new way of attaching a series of plows to a traction-engine, operated by steam or other motive power.

Figures 1 and 2 show a side and plan view of a traction-engine. Fig. 3 is a vertical section of the same. Fig. 4 is a view of a plow-beam and the plate by which it is attached. Fig. 5 is a plan view of the bottom. Fig. 6 is a vertical section of the connecting devices, taken in a plane parallel with the axle, and Fig. 7 is a section across the axle.

The plows are shown, in Figs. 1 and 2 of drawing, arranged diagonally across the the machine. The plow-beams are connected with the beam I of the triangular drawing-frame by plates K. These plates are provided with ribs on the under side which are perpendicular to the line of draft. Each plow-beam is provided with a hinge-plate, L, grooved so as to correspond with the ribs of plates K, and also with a slot, M. These plates K L are clamped together and to beam I by bolts N and suitable screw-nuts. These bolts are themselves provided with the rubber springs O placed under the head of the bolt or under the nut. The object of this arrangement of the spring is to allow the plates L to escape when the tendency of the plates K L is to separate, (by reason of the action of the resistance on the oblique walls of the ribs of each plate.) When this resistance is greater than the resisting power of the springs in the lengthwise direction of the bolts, the said plates L will escape. The tension of these springs may be regulated by screwing up the nuts.

Having thus described all that is necessary to a full understanding of my invention, what I esteem to be new, and desire to protect by Letters Patent, is—

1. The drawing-frame, having beam I and the plow-beams, combined with ribbed plate K and slotted and grooved plate L M, as and for the purpose specified.

2. In combination with beam I and plates K L, the bolts and nuts provided with springs O, arranged as and for the purpose specified.

WILLIAM H. H. HEYDRICK.

Witnesses:
W. W. CASE,
G. W. BESSAN.